O. MARQUARDT.
SIFTING ARRANGEMENT FOR FLOUR MILLS.
APPLICATION FILED NOV. 3, 1909.
1,044,796.
Patented Nov. 19, 1912.
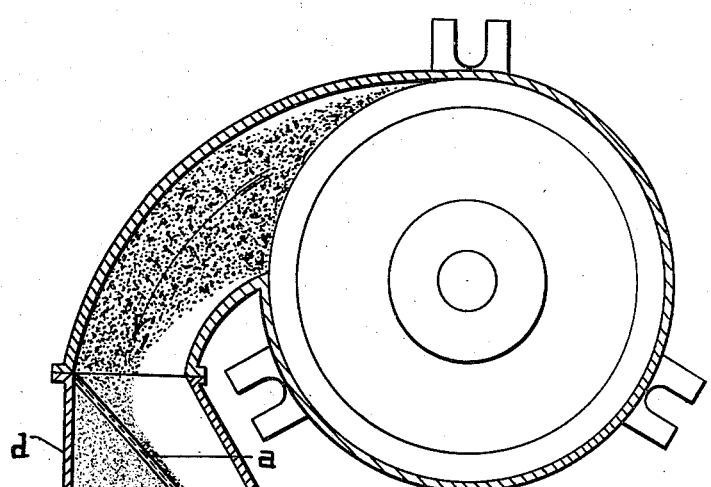
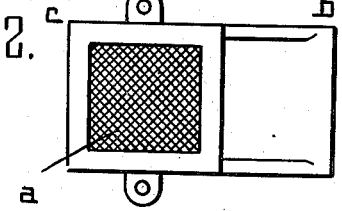

UNITED STATES PATENT OFFICE.

OTTO MARQUARDT, OF SCHNEIDEMÜHL, GERMANY.

SIFTING ARRANGEMENT FOR FLOUR-MILLS.

1,044,796.

Specification of Letters Patent.

Patented Nov. 19, 1912.

Application filed November 3, 1909. Serial No. 526,043.

*To all whom it may concern:*

Be it known that I, OTTO MARQUARDT, joiner, a subject of the German Emperor, and residing at Schneidemühl, Germany, have invented certain new and useful Improvements in Sifting Arrangements for Flour-Mills, of which the following is a specification.

In flour mills in which the product is passed to the discharge by means of an air current in addition to the centrifugal force, the sifting is generally effected by means of oscillating or rotating sieves, an arrangement which, being complicated, requires much space and driving power.

The present invention relates to kibbling-mills or mills for rough-grinding corn, which are considerably simplified in that the groats being thrown from the millstones to the discharge as described above, are conducted to the upper edge of a stationary resilient sieve arranged in oblique position in a casing attached to the discharge chute, whereupon said groats are sifted in passing along the sieve under its gravity assisted by the vibrations of said sieve being only effected by the working of the machine.

In the accompanying drawings the invention is illustrated, Figure 1 representing a longitudinal section through the mill, and Fig. 2 a plan of the sieve.

As shown in Fig. 1, the product is passed by means of an air current in addition to the centrifugal force from the break disks to the discharge chute in the direction of the arrow. In a casing $d$, joined to said chute, a resilient sieve $a$ is arranged in oblique position. The coarse ground corn is fed on the upper edge of said sieve and then sifted in running down due to its gravity as well as to the vibrations of the sieve being effected by the working of the machine. The flour will fall to the discharge opening $c$ while the coarse, branny particles or groats are passed along the sieve to the discharge opening $b$. Sacks may be attached to the openings in which sacks the separated products are then delivered.

Having now particularly described and ascertained the nature of my said invention and in what manner the same is to be performed, I declare that what I claim is:

In a kibbling-mill, the combination with a cylindrical casing, of a pair of mill-stones vertically arranged in said casing, of a downwardly curved outlet connected to said casing and adapted to guide the ground corn being tangentially forced out of the casing, of a discharge chute suspended to said outlet, of a triangular cross-piece attached to the mouth of said discharge chute and adapted to form two discharge openings, and of a vibrating sieve obliquely arranged between the inner edge of said cross-piece and the outer wall of said discharge chute and adapted to cover the outer discharge opening so as to permit the flour to be forced through it and the coarse, branny particles to be passed along it to the inner discharge opening, substantially as set forth.

In testimony whereof, I affix my signature in the presence of two witnesses.

OTTO MARQUARDT.

Witnesses:
HENRY HASPER,
WOLDEMAR HAUPT.